April 11, 1950 — L. E. MYLTING — 2,504,081
METHOD AND APPARATUS FOR HANDLING SOLIDS IN WATER SUSPENSION
Filed Oct. 9, 1946

INVENTOR.
LAURITZ EMIL MYLTING
BY
Richey & Watts
ATTORNEYS

April 11, 1950

L. E. MYLTING 2,504,081

METHOD AND APPARATUS FOR HANDLING
SOLIDS IN WATER SUSPENSION

Filed Oct. 9, 1946

INVENTOR.
LAURITZ EMIL MYLTING
BY
Richey & Watts
ATTORNEYS

Patented Apr. 11, 1950

2,504,081

UNITED STATES PATENT OFFICE 2,504,081

METHOD AND APPARATUS FOR HANDLING SOLIDS IN WATER SUSPENSION

Lauritz Emil Mylting, Merchantville, N. J., assignor to The Allen-Sherman-Hoff Company, Philadelphia, Pa., a corporation of Pennsylvania Application October 9, 1946, Serial No. 702,309

11 Claims. (Cl. 302—14)

1

The present invention relates generally to the art of handling solids and is particularly concerned with a new method of, and new apparatus for, handling solids in water suspension.

Various methods and means have been proposed for handling solids such as ashes and dust from coal burning furnaces, sand, crushed ore, coal, coke, gravel and the like. One system which has been quite valuable commerically is disclosed in U. S. Patent No. 1,560,361. That system is capable of handling not only the large pieces of solids produced by burning coal having large amounts of clinkering ingredients but also finer solids but it requires considerable quantities of water under high pressure. There are many places where only smaller sized solids are to be handled and where high pressure water is not available or is too costly to use for handling such solids. In such places it is impractical to use that patent system and many efforts have been made to provide some other suitable system but none of the many expedients proposed has been satisfactory so far as I am aware.

The present invention, which has proven to be quite satisfactory, may be briefly described as being a system in which solids submerged in a hopper are hydraulically fed into a conduit full of water which travels at a speed sufficiently high to retain the solids in suspension.

The present invention will be better understood by those skilled in the art by reference to the following description and the accompanying drawings which describe and show a preferred form of the present invention.

Figure 1:
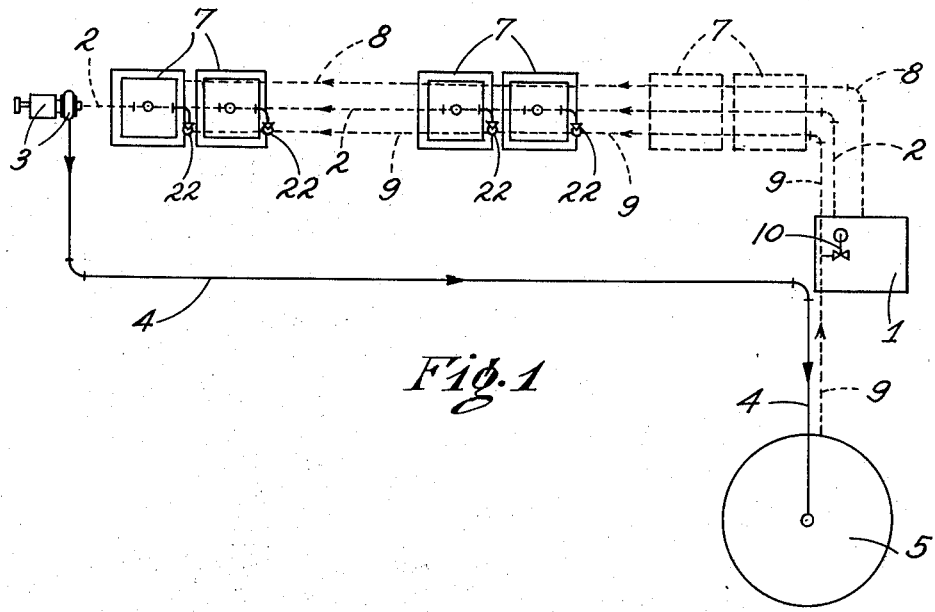
Fig. 1 is a diagrammatic plan view of apparatus embodying the present invention.
Figure 2:
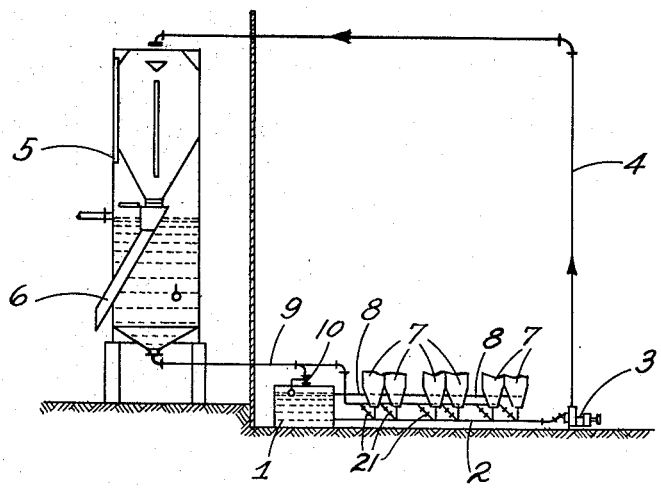
Fig. 2 is a diagrammatic side elevational view of the apparatus of Fig. 1 looking from the top side thereof.

In Figs. 1 and 2 the surge tank 1 is connected thru pipe line 2 to the intake of a centrifugal pump 3. The outlet from pump 3 communicates with pipe line 4 which has a discharge end at the top of separator tank 5. When liquid and solids are discharged thru pipe line 4 into separator tank 5 the solids may be separated therein from the water and discharged thru spout 6, while the water may be collected and retained in the lower part of the tank. A plurality of receiving hoppers 7 are disposed above pipe line 2 between surge tank 1 and pump 3 and the interior of each hopper communicates with the interior of pipe line 2, preferably thru a fitting presently to be described. An equalizer line 8 connects surge tank 1 with the upper portions of hoppers 7. Feed line 9 is connected at one end to the lower part of tank 5, has a branch which is provided with a float control valve 10 thru which water may be led into tank 1 and communicates with pipe 2 in advance of hoppers 7. Preferably, line 9 has valve controlled branches 21 which open into the fittings which connect each hopper 7 with line 2.

Figure 3:
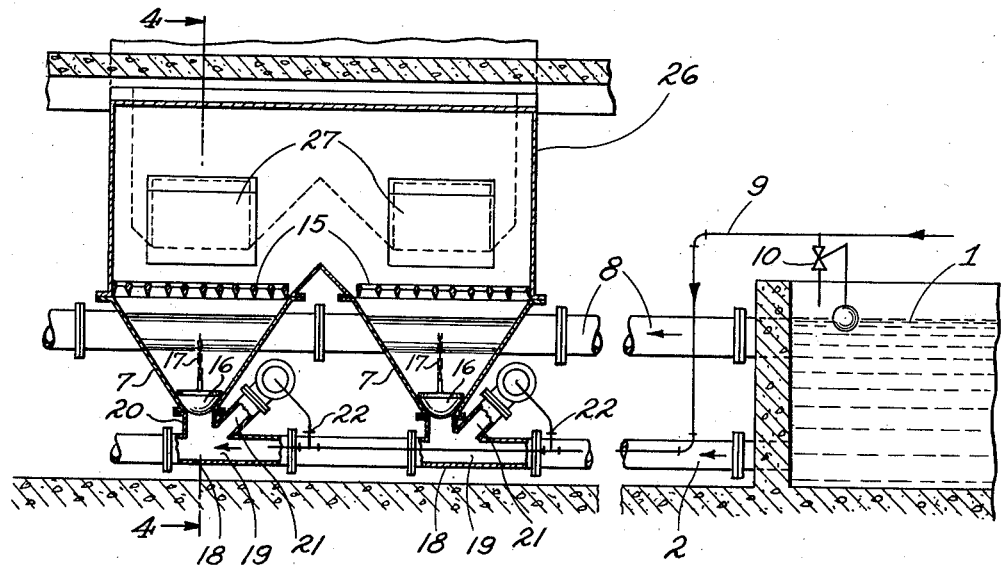
Fig. 3 is a longitudinal, fragmentary, sectional view, partly in elevation, of apparatus shown diagrammatically in Fig. 1 and taken on line 3—3 of Fig. 4.
Figure 4:
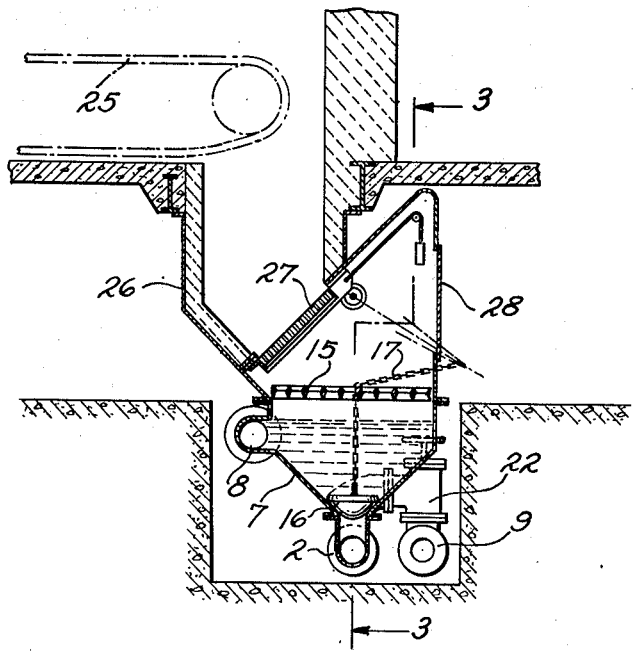
Fig. 4 is a transverse sectional view taken on line 4—4 of Fig. 3.

Figs. 3 and 4 show, in some detail, certain parts of the apparatus shown more or less diagrammatically in Figs. 1 and 2. The receiving hoppers 7 are shown as having open tops provided with screen grates 15 and discharge openings at their bottoms which are closed by plugs 16. Chains 17, which extend up from plugs 16 and thru grates 15 serve to raise and lower the plugs.

Each illustrated hopper 7 is connected with lines 2 and 9 by means of a fitting 18 which comprises a main section 19 which constitutes a part of line 2, a branch 20 which extends upwardly at right angles thereto and is attached to the bottom of the hopper about the bottom discharge opening, and an inclined branch 21 which is connected to line 9 and opens into section 19 at its intersection with branch 20. Preferably, the longitudinal center line of branch 21 extends at an angle of about 45° to the horizontal from the intersection of branch 21 with section 19. Line 9 is provided with valves 22 which control the flow of water into branches 21 of the fittings 18.

Receiving hoppers 7 may be small in size and may be positioned beneath most any kind of solids hopper. In one instance these receiving hoppers 7 were 24" x 24" at the top and were about 30" high from the center line of pipe 2 to the top of the hopper. In this instance lines 2 and 4 were 6" in diameter.

The hopper shown in Figs. 3 and 4 is an ash hopper used with a chain grate stoker. The discharge end of the stoker is shown at 25 and ashes discharged from the stoker are collected in the ash hopper 26 which is provided in its lower portion with conventional gates 27. A housing 28 connects the top of two hoppers 7 with hopper 26 and encloses gates 27 to prevent escape of dust when ash is being transferred from ash hopper 26 into receiving hoppers 7.

The operation of the above described apparatus is substantially as follows: The system is provided initially with a quantity of water which, as shown, fills surge tank 1 to the top of equalizer 8, and fills line 2 and hoppers 7. Assuming that the system is thus provided with water, that a source of water under somewhat higher pressure is available, such as the water of separator tank 5, and that plugs 16 are seated in hoppers 7, the apparatus is in condition for initiating the solids handling operation. The pump 3 is started in operation and pumps water thru pipe line 2 from surge tank 1. As the surface level of water in tank 1 drops, float valve 10 opens and water flows into the tank from line 9. The same water level will be maintained in surge tank 1 and in the several hoppers 7 by the equalizer line 8. The action of this equalizer line is quite important for it insures the maintenance of the system in balance. It prevents removal of all the water from one hopper and the admission of air thru that hopper into the pump and it also prevents overflow of water from any hopper. Any leakage of water or unduly rapid removal of water from one hopper is compensated for immediately by water flowing from surge tank 1 or other hoppers thru equalizer line 8 into the hopper in question. Also, if solids suddenly enter one hopper in volume large enough to cause the hopper to overflow, water will flow to the other hoppers and to the surge tank thru equalizer 8 and thus overflow will be prevented.

With pump 3 operating and plug 16 of one hopper 7 removed from its seat, valve 22 adjacent to that hopper is opened and solids are discharged into that receiving hopper. The solids thus discharged into the receiving hopper will be submerged in water therein and the water level in that hopper will remain substantially unchanged for the reasons just stated. The solids will flow by gravity out of the hopper and into the water flowing in fitting 18. The water flowing thru branch 21 of the fitting is preferably under somewhat higher pressure than the water in surge tank 1 and thus much of the water passing thru pump 3 comes from line 9 rather than from surge tank 1. Since branch 21 discharges water against solids in branch 20 of fitting 18, the feeding of the solids is expedited thereby. This feeding action may be increased somewhat by shifting branch 21 so that more of it opens into branch 20 and may be decreased somewhat by shifting branch 21 in the opposite direction so that more of it opens into pipe 19. The positioning of branch line 21, as just described, results in utilization of a portion of the energy in the incoming water and also results in a substantial increase in absolute head at the suction of pump 3. The practical effect of this increase is that line 2 may be considerably longer than would otherwise be possible.

The water is pumped thru lines 2 and 4 at a velocity which is above the velocity at which the solid being handled will settle out of water. This velocity varies with different solids. For example, with ash from precipitators which does not settle out rapidly, the water may travel at as low a speed as 2 to 4 feet per second. With larger size pieces of ash, up to 1″ or 2″ in over-all dimensions, a velocity of about 12 feet per second is required to prevent settling out. Since it is desirable not only to prevent solids from settling out of the water in the pipe lines but also to utilize the water to its maximum capacity for carrying solids, I prefer to take a major portion of the total water required from pipe 9 thru branches 21 of fittings 18. For example, assuming a pump capacity of 1000 gallons per minute it is quite advantageous to take about 700 gallons per minute thru branch 21 and the remainder thru pipe 19. The amount of water taken thru branch 21 may be controlled by controlling the difference in pressure between the water in surge tank 1 and that in line 9 and, generally speaking, I prefer to use only enough pressure on the water in line 9 to insure the desired amount of flow thru branch 21. It is preferable to provide valves 22 with an orifice plate or some other means for fixing the maximum volume of water than can pass thru them in a given time. That amount is the amount which, when added to the water supplied to the pump from surge tank 1, will satisfy pump 3. Admission of a greater amount would result in overflow from hoppers 7. When the amount of water to be so admitted is determined the orifice or limitation of valve opening is set and is maintained thereafter. Where line 2 is 6″ in diameter, it can handle 700 to 800 pounds of ash per minute at water velocities of about 12 feet per second. It will be understood that higher velocities may be used if desired and that lower velocities may be used with solids which separate out any of the water only at lower speeds.

When the solids have been removed from one hopper 7, plug 16 may be seated and valve 22 closed in that hopper and the plug of another hopper may be raised and solids discharged into and thru that hopper, as has just been described.

Many variations and modifications of the system above described may be made. For example, the pipe line 4 may extend to a fill instead of to separator tank 5, in which case some other source of water for feed line 9 will be required. If and when the fill is sufficiently far below hoppers 7, pump 3 may be omitted. The outlet of line 2 should be far enough below hoppers 7 that the water will flow thru the line at a velocity high enough to retain the solids in suspension. Also, tank 5 may be replaced by a tank which does not recover the water from the mixture of water and solids which is pumped into the tank. In that case, also, another source of water for feed line 9 will be required. Altho I prefer to use fittings 18 with the various hoppers, some of these fittings may be replaced by a straight pipe connection between the hopper and line 2. In that case, one fitting 18 should be installed between surge tank 1 and the first hopper 7, and the valve 22 controlling the inlet of water to branch 21 thereof will be open whenever solids are being removed from any of the hoppers. Furthermore, instead of being collected in hoppers or bins above hoppers 7, solids may be discharged directly into receiving hoppers 7 as by being dumped out of a truck or other conveyor. Obviously tank 1 and hoppers 7 may be separately equipped with water make up inlet valves and overflows to maintain a constant water level, but such apparatus is not preferred because of the multiplicity of controls which are required. Since it is virtually impossible to clog the outlet from the hoppers, solids may be piled high in and above hoppers 7 without any disadvantageous consequences. The water level in the hoppers is maintained substantially constant, as has been described above, and this is true regardless of the height of solids above the receiving hopper. Since the solids are fed out of the hopper hydraulically and into a conduit filled with water flowing at a speed greater than that at which solids will settle out, clogging is prevented and the water is utilized to the maximum of its current carrying capacity.

From what has already been said, it will be understood that the present invention provides a simple, effective, and fool-proof system for handling solids of a variety of kinds and sizes, and that the water may be caused to flow thru the system in such a manner as not only to carry the maximum amount of solids but also to increase the absolute head at the suction of the pump to such an extent that little or no vacuum exists at that place. The present system is highly efficient in handling solids in small and medium sized particles, is easy and economical to operate, and requires simple and inexpensive apparatus.

Having thus described my invention so that others skilled in the art may be able to understand and practice the same, I state that what I desire to secure by Letters Patent is defined in what is claimed.

What is claimed is:

1. Apparatus for handling solids comprising a hopper having a discharge opening in its lower portion, a surge tank, an equalizer pipe connecting the upper portion of said hopper to said tank, a conduit leading from said tank and communicating with said discharge opening, and a feed line for conducting liquid into said conduit between said tank and said hopper.

2. Apparatus for handling solids comprising a hopper having a discharge opening in its lower portion, a surge tank, an equalizer pipe connecting the upper portion of said hopper to said tank, a pump, a conduit connecting said tank and pump and communicating with said discharge opening, and a feed line for conducting liquid into said conduit between said tank and said hopper.

3. Apparatus for handling solids comprising a hopper having a discharge opening in its lower portion, a surge tank, an equalizer pipe connecting the upper portion of said hopper to said tank, a pump, a conduit connecting said tank and pump and communicating with said discharge opening, a separator tank for separating liquid and solids, a pipe line connecting said pump to the top of said separator tank, means to remove separated solids from said separator tank, and a feed line for conducting liquid collected in said separator tank into said conduit between said surge tank and said hopper.

4. Apparatus for handling solids comprising a hopper having a discharge opening in its lower portion, a surge tank, an equalizer pipe connecting the upper portion of said hopper to said tank, a conduit leading from said tank and including a fitting having a branch connected to said hopper about said discharge opening, an inclined branch, and a feed line for conducting liquid into said inclined branch.

5. Apparatus for handling solids comprising a hopper having a discharge opening in its lower portion, a surge tank, an equalizer pipe connecting the upper portion of said hopper to said tank, a conduit leading from said tank and including a fitting having a main section, a branch at right angles to said main section and connected to said hopper about said discharge opening and a branch inclined at an angle of about 45° to said main section intersecting the main section at its intersection with said other branch, and a feed line for conducting liquid into said inclined branch.

6. Apparatus for handling solids comprising a plurality of hoppers of relatively small capacity, each having a discharge opening in its lower portion, a surge tank, an equalizer pipe connecting the upper portions of said hoppers to said tank, a conduit selectively communicable with each of said discharge openings, and a feed line for conducting liquid into said conduit in advance of the openings of said hoppers.

7. Apparatus for handling solids comprising a plurality of hoppers having discharge openings in their lower portions, a surge tank, an equalizer pipe connecting the upper portions of said hoppers to said tank, a pump, a conduit connecting said tank and pump and including fittings connected to said hoppers about said discharge openings, said fittings having inclined inlet branches, and a feed line for conducting liquid at a predetermined rate into said inlet branches.

8. Apparatus for handling solids comprising a plurality of hoppers having discharge openings in their lower portion, a surge tank, an equalizer pipe connecting the upper portions of said hoppers to said tank, a pump, a conduit connecting said tank and pump and including fittings having branches connected to said hoppers about said discharge opening and inclined inlet branches, a separator tank for separating liquid and solids, a pipe line connecting said pump to the top of said separator tank, means to remove separated solids from said separator tank, and a feed line for conducting liquid collected in said separator tank into said inlet branches and into said surge tank.

9. Apparatus for handling solids comprising a plurality of hoppers of relatively small capacity, each having a discharge opening in its lower portion, a liquid carrying conduit selectively communicable with each of said discharge openings, means for maintaining a substantially constant depth of liquid in the hoppers, said means including a conduit connecting a source of liquid with the interiors of the hoppers, and a feed line for conducting liquid into the first said conduit in advance of the openings of said hoppers.

10. Apparatus for handling solids comprising a plurality of hoppers of relatively small capacity, each having a discharge opening in its lower portion, a liquid carrying conduit selectively communicable with each of said discharge openings, means for maintaining a substantially constant depth of liquid in the hoppers, said means including means for conducting liquid into the interiors of the hoppers, and a feed line for conducting liquid into said conduit in advance of the openings of said hoppers.

11. Apparatus for handling solids comprising a plurality of hoppers of relatively small capacity, each having a discharge opening in its lower portion, a liquid carrying conduit selectively communicable with each of said discharge openings, a pump connected to said conduit to insure the flow of liquid through said conduit at a speed sufficiently high to retain in suspension therein solids discharged thereinto from said hoppers, means for maintaining a substantially constant depth of liquid in the hoppers, said means including means for conducting liquid into the interiors of the hoppers, and a feed line for conducting liquid into said conduit in advance of the openings of said hoppers.

LAURITZ EMIL MYLTING.

No references cited.